United States Patent
Kawabe

(10) Patent No.: US 7,095,743 B2
(45) Date of Patent: Aug. 22, 2006

(54) METHOD FOR DETECTING MIS-INSERTION OF ATM CELL, ATM COMMUNICATION SYSTEM AND ATM COMMUNICATION EQUIPMENT

(75) Inventor: Koichi Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 937 days.

(21) Appl. No.: 10/066,686

(22) Filed: Feb. 6, 2002

(65) Prior Publication Data

US 2002/0110126 A1 Aug. 15, 2002

(30) Foreign Application Priority Data

Feb. 9, 2001 (JP) ............... 2001-033938

(51) Int. Cl.
*H04L 12/56* (2006.01)
(52) U.S. Cl. ................ 370/395.1; 370/395.2
(58) Field of Classification Search ............. 370/395.1–395.72, 394, 351–357
See application file for complete search history.

(56) References Cited

U.S. PATENT DOCUMENTS 6,272,128 B1 * 8/2001 Pierson, Jr. ............... 370/352
6,714,543 B1 * 3/2004 Brueckheimer et al. . 370/395.1
6,804,242 B1 * 10/2004 Canelones ............... 370/395.1

* cited by examiner

*Primary Examiner*—Chi Pham
*Assistant Examiner*—Phuc Tran
(74) *Attorney, Agent, or Firm*—Finnegan, Henderson, Farabow, Garrett & Dunner, L.L.P.

(57) ABSTRACT

Utilizing a fact that a header of an ATM cell of which error was not able to be corrected thoroughly by a radio receiver tends to have a certain pattern, a connection designated for a cell having such a certain header pattern is set to insert the particular ATM cell therein, and mis-insertion is detected at an AAL termination section (or an ATM switch) of an ATM communication equipment which is a terminating point of the connection.

12 Claims, 6 Drawing Sheets

METHOD FOR DETECTING MIS-INSERTION OF ATM CELL, ATM COMMUNICATION SYSTEM AND ATM COMMUNICATION EQUIPMENT

CROSS-REFERENCE TO RELATED APPLICATIONS

This application is based upon and claims the benefit of priority from the prior Japanese Patent Application No. 33938/2001, filed on Feb. 9, 2001; the entire contents of which are incorporated herein by reference.

BACKGROUND OF THE INVENTION

1. Field of the Invention

The present invention relates to a method for detecting mis-insertion of an ATM cell and an ATM communication system, and more particularly to a method for detecting mis-insertion of an ATM cell, which can make early detection of mis-insertion of an ATM cell, of which error is hardly detected by an ATM network, and an ATM communication system.

2. Description of the Related Art

Generally, ATM (Asynchronous Transfer Mode) network is based on a connection type communication and assumes a single transmission path as a plurality of virtual transmission paths. Here, a transmission path which actually carries data is called a VC (virtual channel), and a path (route) which includes a plurality of transmission paths is called a VP (virtual path).

Routing (selection of a transmission route) of an ATM cell in the aforementioned ATM network is performed according to a conversion rule of a VCI (virtual channel path identifier) and a VPI (virtual path identifier) which are connection identification information temporarily given to a VC connection and a VP connection.

These VCI and VPI are defined by the header portion of the ATM cell, the connection is set by an ATM switch based on the VPI and VCI of the input cell, VPI/VCI are sequentially converted by a header conversion section in the ATM switch, and the ATM cell is transmitted by inserting the cell into the set connection.

FIGS. 6(a) and 6(b) are diagrams showing details of the format of the ATM cell. FIG. 6(a) shows a cell structure of a user-network interface (UNI), and FIG. 6(b) shows a cell structure of a network-node interface (NNI).

As shown in FIG. 6(a), the UNI cell header has four bits in the first half of a first octet which are general flow control (GFC) bits, a total of 8 bits of four bits in the second half of the first octet and four bits in the first half of a second octet which are virtual path identifier VPI bits, a total of 16 bits ranging from four bits in the second half of the second octet to four bits in the first half of a fourth octet which are virtual channel identifier VCI bits, first three bits in the fourth octet which are payload type (PT) bits, the remaining one bit in the fourth octet which is a cell loss priority (CLP) cell, and eight bits in a fifth octet which are header error control (HEC) bits.

Here, the HEC is comprised of Cyclic Redundancy Check (CRC) which is an error detection signal, an error which can be corrected by the HEC is one bit only, and the UNI cell and the NNI cell have a common structure excepting the presence or not of an GFC.

The transmission of data by the ATM is predicated on the use of a signal line, such as an optical fiber cable, having good line quality. In other words, it is assumed that the transmission data is substantially free from an error, and therefore, even the aforementioned HEC which is poor in the error detection and correction ability can keep satisfactory quality of transmission data.

However, when a radio transmission path is used for a part of the ATM network, lots of errors may be caused in the transmission data in this radio communication section depending on conditions that the weather is good or not, there is a disturbance or not, and the like.

Generally, a data error caused in the radio communication section is detected/corrected by an error correcting function of a radio receiver and sent as normal data to the ATM communication equipment, but because many data errors are easily caused in the radio communication section, there may be data of which error cannot be corrected by the error correcting function of the radio receiver.

When such error data of which error could not be corrected by the radio receiver is input to the ATM communication equipment, the error detection function of the ATM communication equipment operates.

And, if an ATM layer of the ATM communication equipment could detect an error (unset VPI/VCI or HEC error), the error data can be disposed, but if could not, the error data enters the ATM network and cannot be disposed until the error is detected by a higher-rank layer which is ranked higher than the ATM layer.

The more the detection of the mixture of the error data is delayed, the more an influence caused on the network becomes large. Even if the error is detected by the higher-rank layer, it is difficult to identify the cause of the error or the location where the error has occurred, so that it is not advisable to expect the detection of the error by the higher-rank layer.

SUMMARY OF THE INVENTION

Accordingly, it is an object of the present invention to provide a method for detecting a mis-insertion of an ATM cell and an ATM communication system, which can make early detection of error data which was not corrected by an error correcting function of a radio receiver and input to an ATM communication equipment.

In order to achieve the above object, the present invention may provide a method of detecting a mis-insertion of an ATM cell in an ATM network having a plurality of ATM communication equipments disposed for transmitting and receiving ATM cells, comprising: setting a special connection for transferring an ATM cell in which a virtual path identifier VPI and a virtual channel identifier VCI have particular values; and detecting the ATM cell, which is transferred by the special connection, at a terminating point of the special connection as a mis-insertion cell.

Here, at least some ATM communication equipments among the plurality of ATM communication equipments perform radio communication using a radio transmission path on which radio equipments are disposed.

And, the terminating point of the special connection is set at an AAL termination section or an ATM switch of the ATM communication equipment that performs the radio communication or at a later stage ATM communication equipment of the ATM communication equipments that perform the radio communication.

The ATM communication system according to an embodiment of the present invention is an ATM communication system in which a plurality of ATM communication equipments for transmitting and receiving ATM cells are disposed, and at least some ATM communication equipments among the plurality of ATM communication equipments perform radio communication using a radio transmission path on which radio equipments are disposed, comprising: special connection setting means for setting a special connection which is used for transferring of an ATM cell in which a virtual path identifier VPI and a virtual channel identifier VCI have particular values; and mis-insertion cell detecting means disposed at a terminating point of the special connection set by the special connection setting means, for detecting the ATM cell transferred by the special connection as a mis-insertion cell.

Here, the terminating point of the special connection is set at an AAL termination section or an ATM switch of the ATM communication equipment that performs the radio communication or at a later stage ATM communication equipment of the ATM communication equipments that perform the radio communication.

The ATM communication equipment according to an embodiment of the present invention is an ATM communication equipment for transmitting and receiving an ATM cell by setting a connection according to a virtual path identifier VPI and a virtual channel identifier VCI, comprising: particular VPI/VCI storage means for storing a particular virtual path identifier VPI and a particular virtual channel identifier VCI; destination setting means for setting a destination of an ATM cell having the virtual path identifier VPI and the virtual channel identifier VCI stored by the particular VPI/VCI storage means; and an ATM switch for setting a connection at the destination set by the destination setting means to route the ATM cell which has the virtual path identifier VPI and the virtual channel identifier VCI stored by the particular VPI/VCI storage means among received ATM cells.

Here, the particular VPI/VCI storage means stores a plurality of virtual path identifiers VPI and a plurality of virtual channel identifiers VCI; and the destination setting means sets a destination for each of the plurality of virtual path identifiers VPI and virtual channel identifiers VCI.

The ATM communication equipment according to an embodiment of the present invention is an ATM communication equipment which sets a connection according to a virtual path identifier VPI and a virtual channel identifier VCI and transmits and receives ATM cells, comprising: particular VPI/VCI storage means for storing a particular virtual path identifier VPI and a particular virtual channel identifier VCI; and mis-insertion cell detecting means for detecting as a mis-insertion cell the ATM cell having the virtual path identifier VPI and the virtual channel identifier VCI stored by the particular VPI/VCI storage means.

Here, the particular VPI/VCI storage means stores a plurality of virtual path identifiers VPI and a plurality of virtual channel identifiers VCI; and the mis-insertion cell detecting means detects as a mis-insertion cell the ATM cell having any of the plurality of virtual path identifiers VPI and the plurality of virtual channel identifiers VCI.

The ATM communication equipment according to an embodiment of the present invention is an ATM communication equipment which sets a connection according to a virtual path identifier VPI and a virtual channel identifier VCI and transmits and receives an ATM cell, comprising: particular VPI/VCI storage means for storing a particular virtual path identifier VPI and a particular virtual channel identifier VCI; destination setting means for setting a destination of an ATM cell having the virtual path identifier VPI and the virtual channel identifier VCI stored by the particular VPI/VCI storage means; an ATM switch for setting a connection at the destination set by the destination setting means to route the ATM cell which has the virtual path identifier VPI and the virtual channel identifier VCI stored by the particular VPI/VCI storage means among received ATM cells; and mis-insertion cell detecting means for detecting as a mis-insertion cell the ATM cell having the virtual path identifier VPI and the virtual channel identifier VCI stored by the particular VPI/VCI storage means.

Here, the particular VPI/VCI storage means stores a plurality of virtual path identifiers VPI and a plurality of virtual channel identifiers VCI; and the destination setting means sets a destination for each of the plurality of virtual path identifiers VPI and the plurality of virtual channel identifiers VCI.

Further, the mis-insertion cell detecting means detects as a mis-insertion cell the ATM cell having any of the plurality of virtual path identifiers VPI and the virtual channel identifiers VCI.

DETAILED DESCRIPTION OF THE EMBODIMENTS

Embodiments of the method for detecting a mis-insertion of an ATM cell and the ATM communication system according to this invention will be described in detail with reference to the accompanying drawings.

Figure 1:
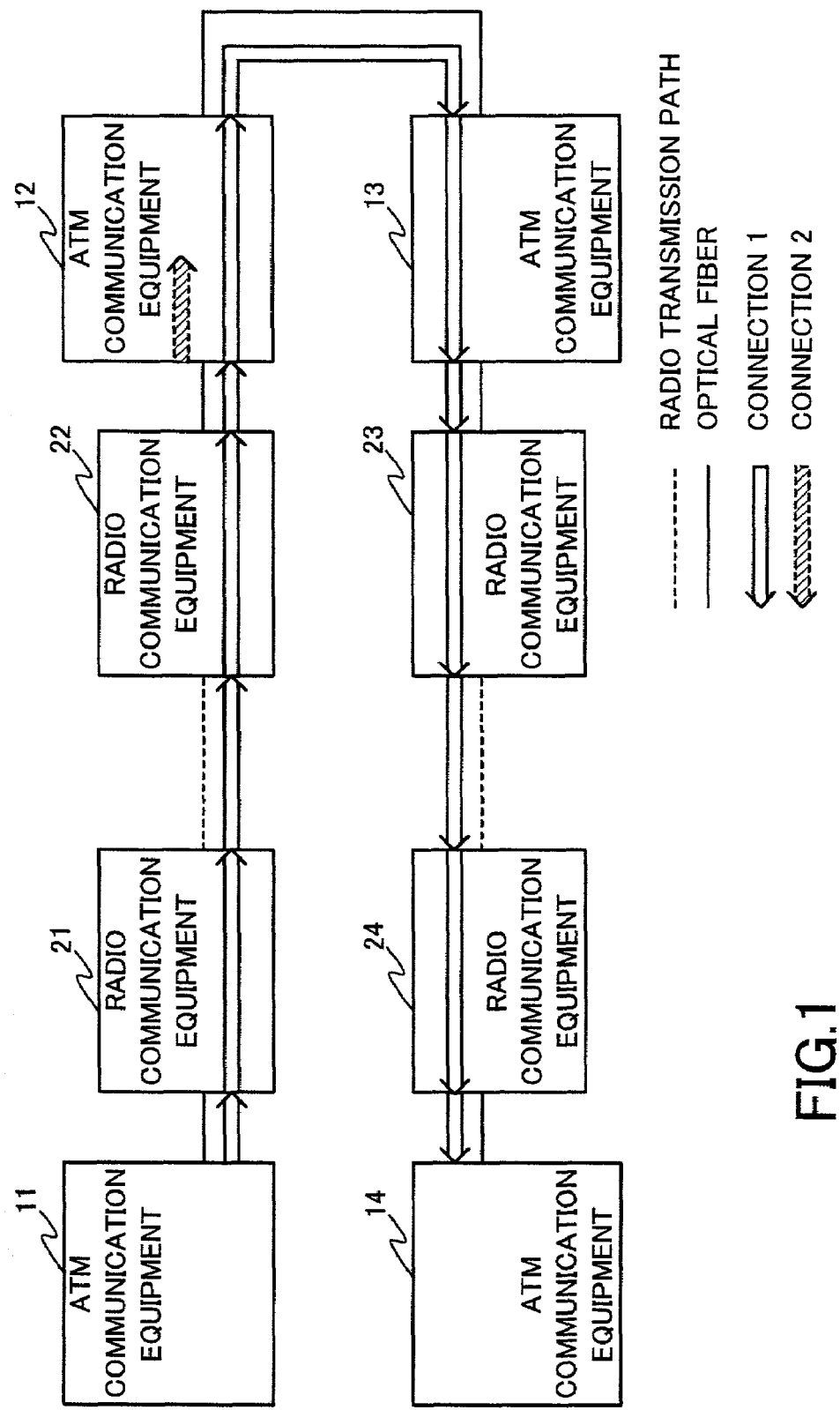
FIG. 1 is a diagram showing a connection setting method according to an embodiment of the present invention.

FIG. 1 is a diagram showing one example of the ATM network to which the method for detecting mis-insertion of an ATM cell and the ATM communication system according to embodiments of the present invention are applied.

In FIG. 1, this ATM network is comprised of ATM communication equipments 11, 12, 13, 14 and radio communication equipments 21, 22, 23, 24. The ATM communication equipment 11 and the ATM communication equipment 12 are connected wireless via the radio communication equipment 21 and the radio communication equipment 22. The ATM communication equipment 12 and the ATM communication equipment 13 are connected over an optical fiber cable. The ATM communication equipment 13 and the ATM communication equipment 14 are connected wireless via the radio communication equipment 23 and the radio communication equipment 24.

The ATM communication equipment 12, to which ATM cell is input from the radio communication equipment 22, sets a connection with reference to VPI/VCI of the input ATM cell and inserts the ATM cell into the set connection.

Here, a radio transmission path for communication via the radio communication equipment 21 and the radio communication equipment 22 may have many errors in transmission data depending on conditions that the weather is good or bad, there is a disturbance or not, or the like.

Therefore, the ATM network according to an embodiment of the present invention is configured to utilize a fact that error data, which could not corrected thoroughly by the radio communication equipment 22, tends to be an ATM cell having a particular pattern, namely a particular VPI/VCI, to particularly set a connection dedicated for the transfer of the inserted cell, to transfer the mis-insertion cell to a particular place and to detect the mis-insertion at the transmission destination.

Here, it is assumed that many bit errors have occurred in a radio transmission path for communicating via the radio communication equipment 21 and the radio communication equipment 22.

In this case, the radio communication equipment 22 functions to correct a bit error, but when an error rate becomes large, it becomes impossible to normally correct the bit error.

Here, when the bit error is not properly corrected, VPI/VCI of the ATM header of the ATM cell which has passed through the error correcting function of the radio communication equipment 22 becomes a particular value, and HEC may become normal. When this particular value is assumed to have a plurality of patterns, it is assumed to be as follows:

$VPI/VCI=x$, and $VPI/VCI=y$, where, x: a connection for an actual effective cell used for ordinary operation, and y: a connection not used for ordinary operation.

In this case, the ATM cell, which has become VPI/VCI=x by the error correction made by the radio communication equipment 22, is mis-inserted into the connection x for the effective cell. And, the ATM cell, which has become VPI/VCI=y by the error correction made by the radio communication equipment 22, is not set a connection by the ATM switch of the ATM communication equipment 22 when this invention is not applied, so that it is abandoned by the ATM switch.

The ATM network according to the embodiment of the present invention also sets a connection for VPI/VCI=y by the ATM switch of the ATM communication equipment 22.

Specifically, it is configured not to abandon the ATM cell of VPI/VCI=y by the ATM switch of the ATM communication equipment 22. The ATM cell of VPI/VCI=y is set its transmission destination to, for example, AAL termination section of the ATM communication equipment 22. In this case, the AAL termination section of the ATM communication equipment 22 does not set the connection of VPI/VCI=y.

A specific example that error data not corrected thoroughly by the radio communication equipment 22 tends to be an ATM cell having a particular pattern, namely particular VPI/VCI, will be described below.

Generally, a cell flowing over the ATM network contains a non-assigned cell (cell not having data which should be transmitted, namely a cell having an empty payload area).

The header pattern of this non-assigned cell is common, all four bytes in the first half other than the HEC are "0", and when a fixed computation is performed for this portion, the HEC becomes "55(h)". Therefore, last two bytes of the header of the non-assigned cell may be "0055(h)".

Figure 2A:
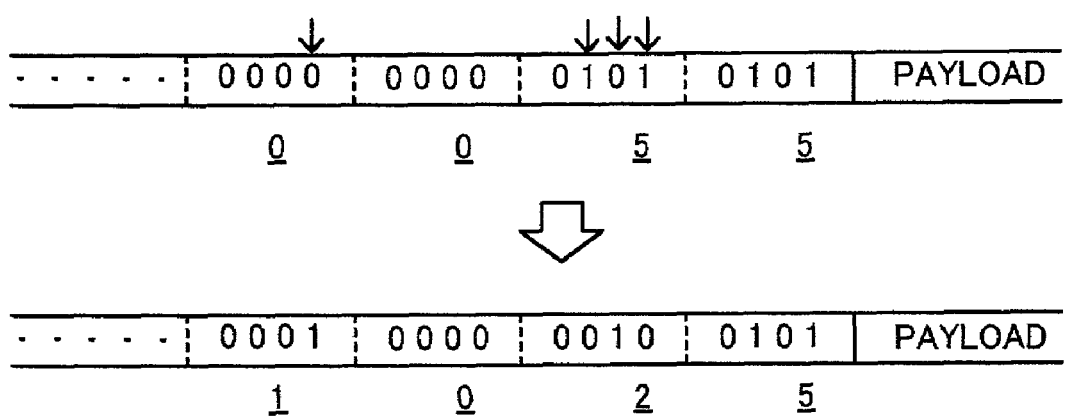
FIGS. 2(a) and 2(b) are diagrams illustrating features of a bit error in a radio communication section.

But, as shown in FIG. 2(a), when a bit error occurs in the non-assigned cell in the radio communication section and a value "0055(h)" of the last two bytes of the header is changed to "1025(h)", a predetermined computation performed on the four bytes in the first half of the header of the non-assigned cell having such a bit error results in the HEC value "25(h)". Therefore, a header error in the non-assigned cell can not be identified on the side of the ATM network because the value of the first half of the header and the value of HEC are matched, and a cell which should be abandoned as error data is taken into the ATM network.

Figure 2B:
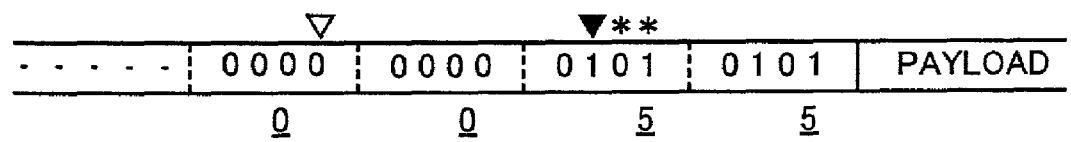

Besides, a transmission system which transmits a difference of a transmission signal using differential conversion is generally employed in the radio communication section. This transmission system has a feature that if a certain bit has an error, it results in affecting on two bits after the error bit by predetermined bits. Therefore, as shown in FIG. 2(b), when a bit error occurs in the bit at position ∇, data at position * cannot be trustworthy. Therefore, it happens that when 2 bits at the positions ∇ and 569 in the radio communication section have a bit error, the value of 2 bits at the header end changes from "0055(h)" to "1025(h)".

As described above, the ATM network includes very many non-assigned cells, and when the quality deterioration of the radio transmission path due to bad weather or the like continues for a long time, error data which can not be identified by the ATM network side occurs in quantity which cannot be disregarded, and a trouble is caused in the ATM network.

Therefore, for an ATM cell of which error cannot be detected by the ATM layer because the value of 4 bytes in the first half of the header and the value of HEC are accidentally matched though it is an error data, the present invention sets a special connection, inserts the ATM cell into the set special connection, and transfers the error data ATM cell to a predetermined place to detect the mis-insertion.

It is to be understood that the value of VPI/VCI of the cell having the header pattern which is matched with the value of HEC regardless of the error data is not limited to the aforementioned x, y.

In FIG. 1, when the input cell is an effective cell or the value of VPI/VCI is a cell of "x", the ATM communication equipment 12 refers to the VPI/VCI of the pertinent cell to set connection 1 and inserts the cell into the set connection 1.

The terminating point of the connection 1 in FIG. 1 is the ATM communication equipment 14, and the cell inserted into the connection 1 is sent to the ATM communication equipment 14 via the ATM communication equipment 13.

When the value of VPI/VCI of the input ATM cell is "y", the ATM communication equipment 12 sets, for example, a connection 2 designating the AAL termination section of the ATM communication equipment 12 as the terminating point, and inserts the pertinent cell into the set connection 2.

Figure 3:
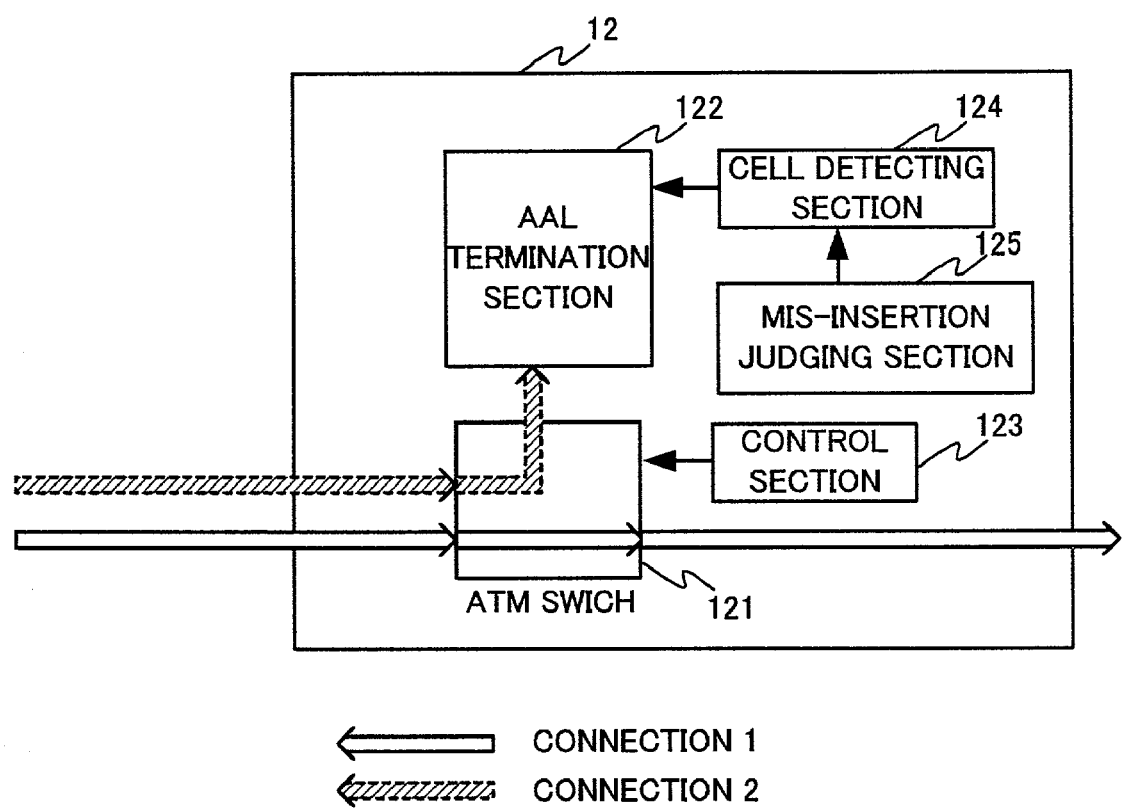
FIG. 3 is a diagram showing the details of connection setting made by the ATM communication equipment.

FIG. 3 is a diagram showing a flow of the cell when the connection 2 is set at its own AAL termination.

In FIG. 3, at the ATM switch 121 of the ATM communication equipment 12, the connection 2 designating the AAL termination section 122 as the terminating point for the cell having the value "y" of VPI/VCI. In this ATM communication equipment 12, when the ATM cell reaches the AAL termination section 122 of the ATM communication equipment 12, cell detecting section 124 detects the ATM cell which has reached the AAL termination section 122, and mis-insertion judging section 125, which previously stores "y" as the value of VPI/VCI of the mis-insertion cell, determines whether the VPI/VCI of the cell detected by the cell detecting section 124 is "y", and if it is "y", detects the pertinent cell as the mis-insertion cell.

The connection which is set by the ATM switch 121 is previously determined for VPI/VCI by control section 123. Therefore, the connection corresponding to a particular VPI/VCI can be changed to a desired connection via the control section 123.

Figure 4:
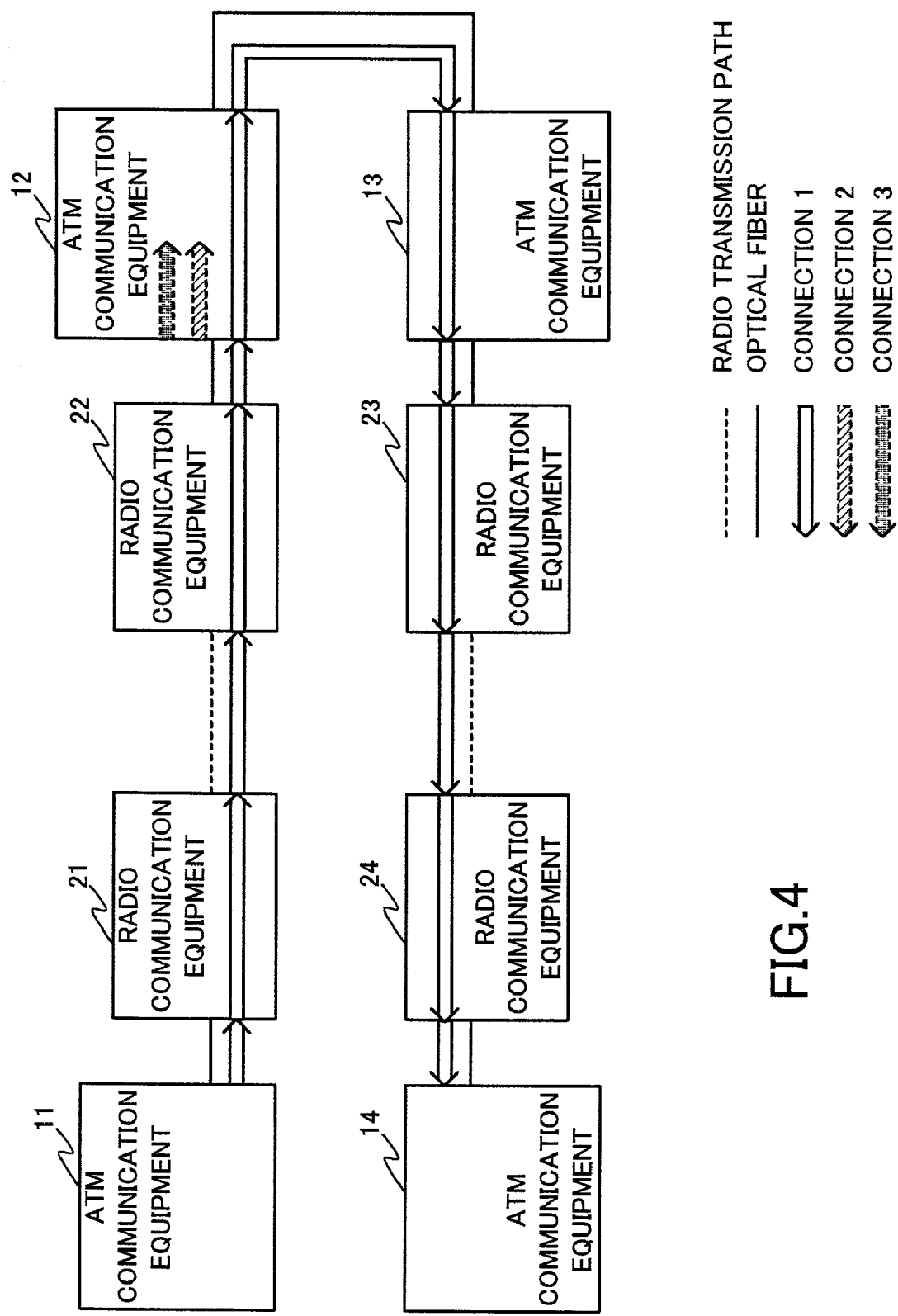
FIG. 4 is a diagram showing a connection setting method according to another embodiment of the present invention.

As shown in FIG. 4, the ATM communication equipment 12 can set special connections 2 and 3 designating the AAL termination section 122 of the ATM communication equipment 12 as the terminating point for two types of ATM cells which have value "y1" or "y2" for VPI/VCI, and can detect the two types of ATM cells having VPI/VCI=y1 or y2 as a mis-insertion cell.

Figure 5:
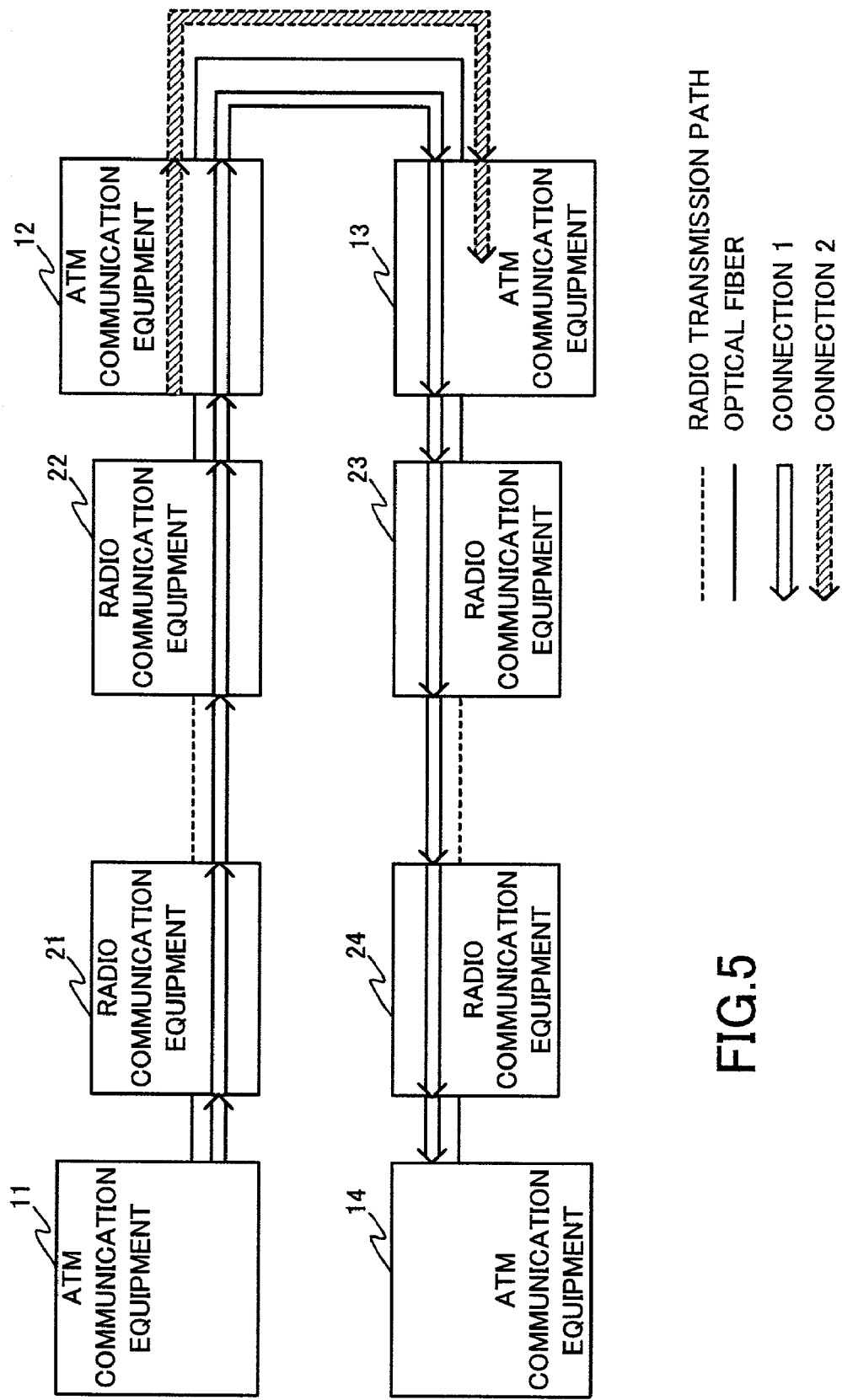
FIG. 5 is a diagram showing a connection setting method according to still another embodiment of the present invention.
Figure 6A:
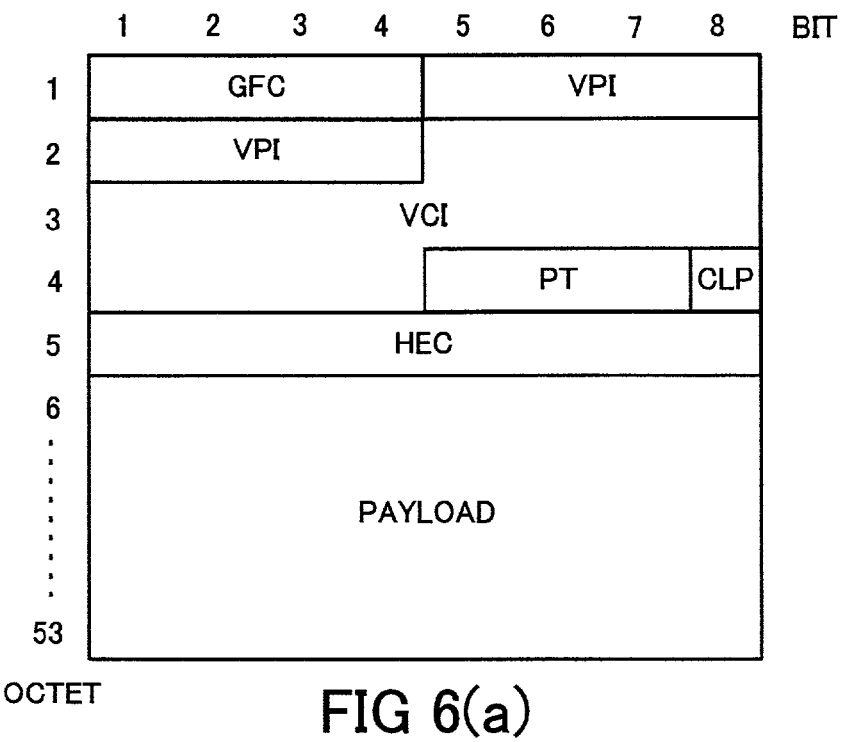
FIGS. 6(a) and 6(b) are diagrams showing structures of the ATM cell.
Figure 6B:
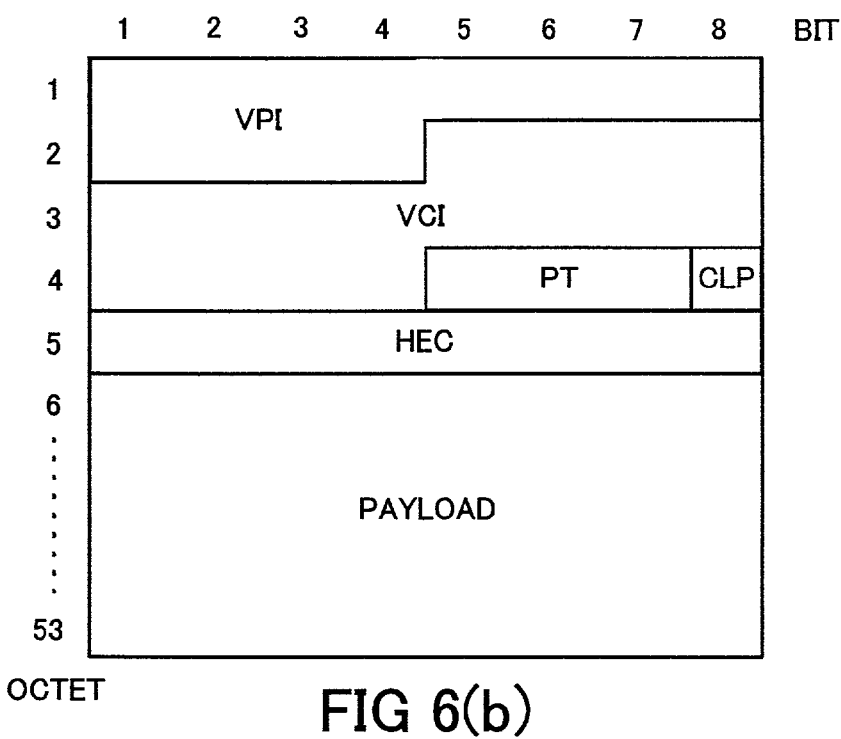

This special connection may designate the AAL termination section of the ATM communication equipment 13 as the terminating point, as shown in FIG. 5. Therefore, a place of detecting the mis-insertion can be selected as desired by selectively setting the terminating point of the special connection, and an error-occurred place can be identified by setting the terminating point of the special connection.

Furthermore, the terminating point of the special connection is not limited to the AAL termination section, but may be set at any place such as an ATM switch, etc., for example, as long as the mis-insertion can be detected at that place. Accordingly, in FIG. 3 for example, when the ATM switch 121 is set as the terminating point of the special connection, the cell detecting section 124 detects the ATM cell arrived at the ATM switch 121, the mis-insertion judging section 125 stores in advance "y" as the VPI/VCI value of the mis-insertion cell, judges whether or not a VPI/VCI value of the cell detected by the cell detecting section 124 is "y" and if the judged value is "y", detects this cell as the mis-insertion cell.

What is claimed is:

1. A method of detecting a mis-insertion of an ATM cell in an ATM communication system using an ATM network having a plurality of ATM communication units disposed for transmitting and receiving ATM cells, comprising:
    setting a special connection, which corresponds to a connection that is not used in a regular operation, in the ATM communication units, for transferring a mis-insertion cell that has become an ATM cell in which a virtual path identifier VPI and a virtual channel identifier VCI have particular values; and
    discriminating the mis-insertion of the ATM cell by detecting the mis-insertion cell having the particular VPI and VCI values, which is transferred by the special connection, at a terminating point of the special connection.

2. The method of detecting a mis-insertion of an ATM cell according to claim 1, wherein a radio transmission path using radio equipment is formed between at least some ATM communication units among the plurality of ATM communication units, and the virtual path identifier VPI and the virtual channel identifier VCI having particular values are a virtual path identifier VPI and a virtual channel identifier VCI anticipated when the radio equipment performs a bit error correcting function for a predetermined non-assigned cell that is transmitted through the radio transmission path.

3. The method of detecting a mis-insertion of an ATM cell according to claim 2, wherein the special connection is set in an ATM switch of the ATM communication units that receives the ATM cell through the radio transmission path, and the terminating point of the special connection is set at an AAL termination section of the ATM communication unit that receives the ATM cell through the radio transmission path.

4. The method of detecting a mis-insertion of an ATM cell according to claim 2, wherein the terminating point of the special connection is set in a later stage ATM communication unit of the ATM communication unit to which the special connection is set.

5. The method of detecting a mis-insertion of an ATM cell according to claim 2, wherein the terminating point of the special connection is set in a final stage ATM communication unit in the ATM network.

6. An ATM communication system in which a plurality of ATM communication units for transmitting and receiving ATM cells are disposed, comprising:
    special connection setting means, disposed in the ATM communication unit, for setting a special connection which corresponds to a connection that is not used in a regular operation, for transmitting a mis-insertion cell that has become an ATM cell in which a virtual path identifier VPI and a virtual channel identifier VCI have particular values; and
    cell mis-insertion discriminating means disposed at a terminating point of the special connection set by the special connection setting means, for discriminating a mis-insertion of the ATM cell having the particular VPI and VCI values by detecting the mis-insertion cell transferred through the special connection.

7. The ATM communication system according to claim 6, wherein the terminating point of the special connection is set in a later stage ATM communication unit of the ATM communication unit to which the special connection setting means is disposed.

8. The ATM communication system according to claim 6, wherein the terminating point of the special connection is set in a final stage ATM communication unit of the ATM communication units in the ATM network.

9. The ATM communication system according to claim 6, wherein a radio transmission path using radio equipment is formed between at least some ATM communication units among the plurality of ATM communication units, and the virtual path identifier VPI and the virtual channel identifier VCI having the particular values are a virtual path identifier VPI and a virtual channel identifier VCI anticipated when the radio equipment performs a bit error correcting function for a predetermined non-assigned cell, which is transmitted through the radio transmission path.

10. The ATM communication system according to claim 9, wherein the special connection setting means is disposed in the ATM communication unit that receives the ATM cell through the radio transmission path, and the terminating point of the special connection is set at an AAL termination section of the ATM communication unit that receives the ATM cell through the radio transmission path.

11. An ATM communication unit for transmitting and receiving an ATM cell by setting a connection according to a virtual path identifier VPI and a virtual channel identifier VCI, comprising:
    special connection setting means for setting a special connection, which corresponds to a connection that is not used in a regular operation, for transferring a mis-insertion cell that has become an ATM cell in which the virtual oath identifier VPI and the virtual channel identifier VCI have particular values;
    ATM switching means for routing the mis-insertion cell having the particular VPI and VCI values based on the special connection that is set by the special connection setting means;
    an AAL termination section that terminates the special connection set by the special connection setting means;

cell detecting means for detecting the mis-insertion cell at the AAL termination section; and cell mis-insertion discriminating means for discriminating the mis-insertion of the ATM cell based on a detection output of the cell detecting means.

12. The ATM communication unit according to claim 11 wherein;

the ATM cell is received through a radio transmission path using radio equipment, and the virtual path identifier VPI and the virtual channel identifier VCI having the particular values are a virtual path identifier VPI and a virtual channel identifier VCI anticipated when the radio equipment performs a bit error correcting function for a predetermined non-assigned cell, which is transmitted through the radio transmission path.

* * * * *

UNITED STATES PATENT AND TRADEMARK OFFICE
CERTIFICATE OF CORRECTION

| | |
|---|---|
| PATENT NO. | : 7,095,743 B2 |
| APPLICATION NO. | : 10/066686 |
| DATED | : August 22, 2006 |
| INVENTOR(S) | : Kawabe |

It is certified that error appears in the above-identified patent and that said Letters Patent is hereby corrected as shown below:

Claim 3, column 7, lines 62-63, change "units that receives" to --unit that receives--.

* Claim 6, column 8, line 14, change "connection" to --connection,--.

* Claim 11, column 8, line 60, change "oath" to --path--.

* Claim 12, column 9, line 6, change "claim 11" to --claim 11, --.

* Claim 12, column 9, line 7, change "wherein:" to --wherein--.

Signed and Sealed this

Twelfth Day of December, 2006

JON W. DUDAS
*Director of the United States Patent and Trademark Office*